June 3, 1941. H. SLAWATYCKI 2,243,890
AUTOMOBILE DIRECTION SIGNAL SWITCH
Filed April 30, 1940 2 Sheets-Sheet 1

Inventor
HENRY SLAWATYCKI
By Clarence A. O'Brien
Attorney

June 3, 1941.  H. SLAWATYCKI  2,243,890
AUTOMOBILE DIRECTION SIGNAL SWITCH
Filed April 30, 1940  2 Sheets-Sheet 2
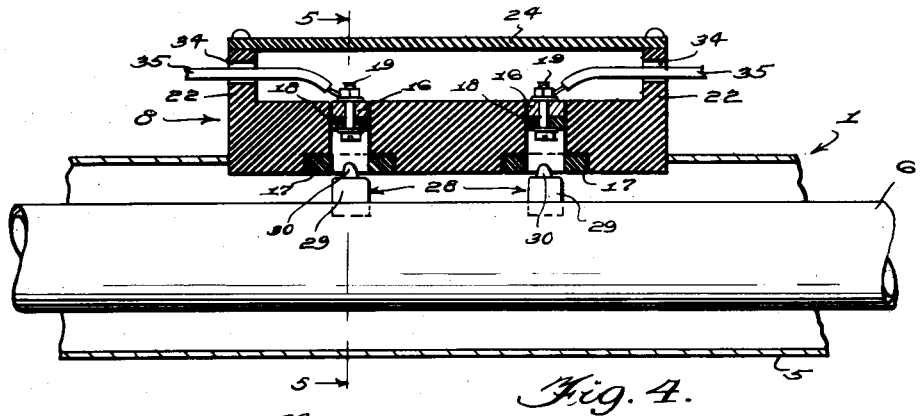
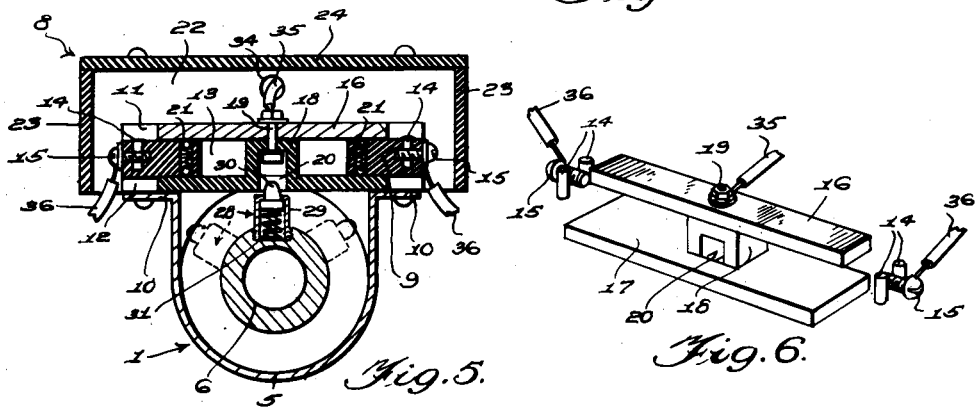
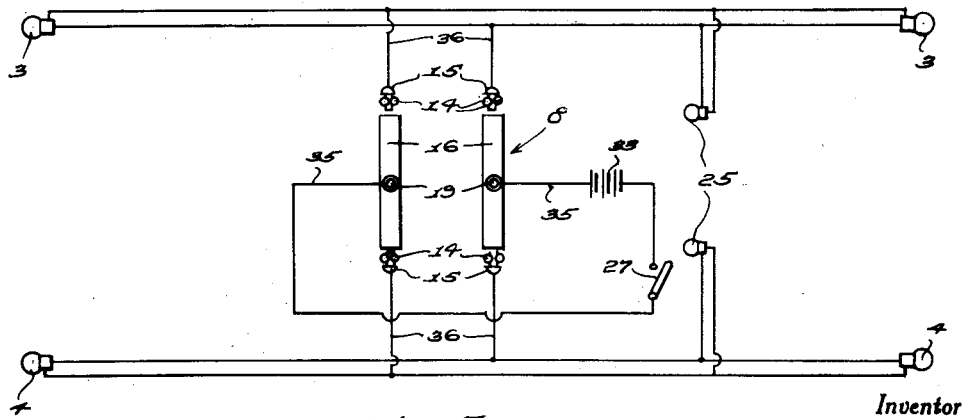
Inventor
HENRY SLAWATYCKI
By Clarence A. O'Brien
Attorney Patented June 3, 1941

2,243,890

UNITED STATES PATENT OFFICE 2,243,890

AUTOMOBILE DIRECTION SIGNAL SWITCH

Henry Slawatycki, Buffalo, N. Y., assignor of forty-eight and one-half per cent to Joseph J. Stelmach, Buffalo, N. Y.

Application April 30, 1940, Serial No. 332,574

2 Claims. (Cl. 200—59)

The present invention relates to new and useful improvements in switches for automobile direction signals and has for its primary object to provide, in a manner as hereinafter set forth, a device of this character which is adapted to be mounted on the steering column of the vehicle and actuated by the shaft of said steering column for automatically indicating right and left turns.

Other objects of the invention are to provide an automobile direction signal switch of the aforementioned character, which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a view in vertical longitudinal section, taken substantially on the line 4—4 of Fig. 3.

Figure 5 is a cross sectional view, taken substantially on the line 5—5 of Fig. 4.

Figure 6 is a perspective view, showing one of the slidable brushes, the stationary contacts engageable thereby, etc.

Figure 7 is a diagrammatic view of the electric wiring system.

Figure 1:
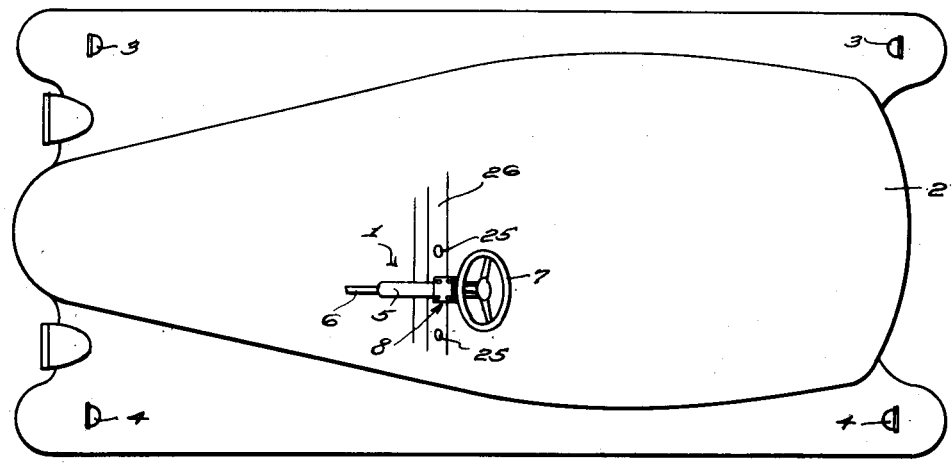
Figure 1 is a top plan view of a motor vehicle equipped with direction signals, showing a switch constructed in accordance with the present invention mounted on the steering column of said vehicle.
Figure 2:
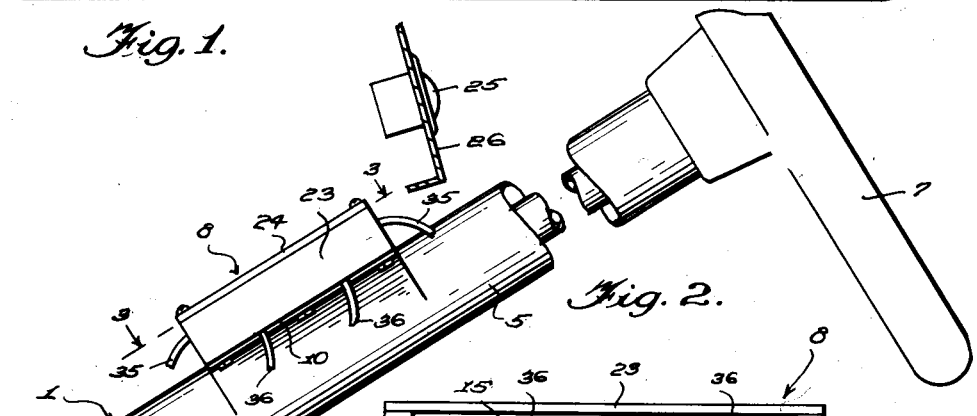
Figure 2 is a view in side elevation of the automobile steering column, showing the switch mounted thereon.
Figure 3:
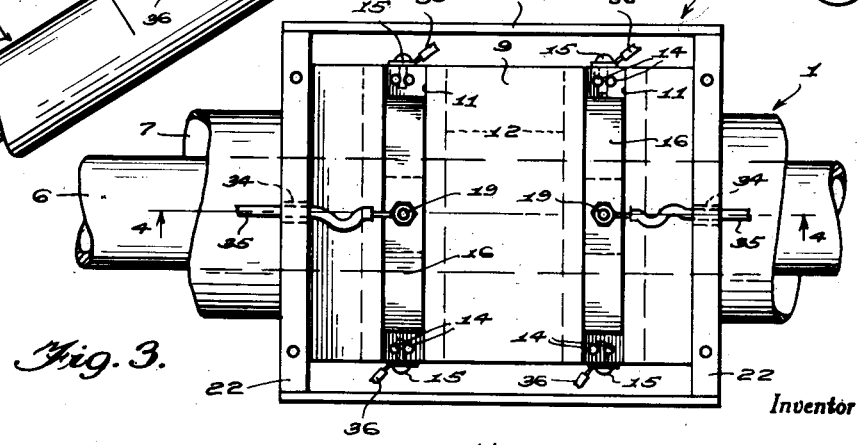
Figure 3 is a sectional view, taken substantially on the line 3—3 of Fig. 2.

Referring now to the drawings in detail, it will be seen that the reference numeral 1 designates generally the steering column of an automobile 2. Mounted on the front and rear fenders of the vehicle 2 are suitable electric direction signals 3 and 4. The column 1 includes a tubular housing 5 which encloses a steering shaft 6. Mounted on the shaft 6 is a steering wheel 7.

At an intermediate point, the housing 5 of the steering column 1 is formed to provide a longitudinally extending opening for the reception of the switch which is designated generally by the reference numeral 8. The embodiment of the switch 8 which has been illustrated comprises a substantially rectangular plate 9 of suitable hard insulating material, such as Bakelite. The insulating plate 9 is firmly secured to outturned flanges 10 which are formed integrally with the housing 5 at the longitudinal sides of the previously mentioned opening therein. Formed transversely in the upper and lower faces of the plate 9 are grooves 11 and 12, the latter being comparatively wide. Transverse slots 13 in the plate 9 establish communication between the grooves 11 and 12. Embedded in the side portions of the plate 9 and exposed in the end portions of the grooves 11 are pairs of stationary contacts 14. Binding posts or screws 15 extend into the plate 9 from the side edges thereof and are engaged with the pairs of contacts 14 between said contacts.

Slidably mounted in the grooves 11 are brushes 16 which are engageable with either pair of the contacts 14 in said grooves 11. Slidably mounted in the grooves 12 are bars 17 of suitable insulating material, such as Bakelite. The bars 17 have formed integrally therewith socketed protuberances 18 which are operable in the slots 13 and to which the brushes 16 are secured through the medium of binding posts 19. Thus, openings 20 are formed in the bars 17. Mounted in the plate 9, adjacent the ends of the slots 13, are spring pressed ball detents 21 which are engaged with the brushes 16 and the bars 17 for frictionally securing the former in any position.

End bars 22 are provided on the plate 9, said end bars rising above and extending beyond the sides of said plate. Extending between the ends of the bars 22 are side members or bars 23 which, it will be observed, are spaced from the longitudinal side edges of the plate 9. Secured on top of the bars 22 is a removable cover plate 24.

The reference numeral 25 designates indicating lights on the instrument panel 26 of the vehicle 2 for the right and left turn signals 3 and 4, respectively. Of course, one of the lights 25 is interposed in the circuit of the right turn signals 3 and the other of said lights 25 is interposed in the circuit of the left turn signals 4. As seen in Fig. 7 of the drawings, the lights on each side of the vehicle are in parallel. A hand or manual switch 27 is provided for throwing the entire system out of operation when desired.

Mounted on the steering shaft 6 of the column 1 are fingers which are designated generally by the reference numeral 28. As best seen in Fig. 5 of the drawings, each finger 28 includes a tubular casing 29 mounted on the shaft 6, the free end of said casing being internally flanged. Slidable in the tubular casing 29 and adapted to project therefrom is a detent 30. A coil spring 31 projects the detent 30.

It is thought that the operation of the invention will be readily apparent from a consideration of the foregoing. Briefly, when the vehicle is traveling straight ahead, or substantially so, the fingers 28 on the shaft 6 are in the position shown in Fig. 5 of the drawings, in which position the detents 30 are engaged in the openings 20 in the bars 17. Also, the brushes 16 are out of engagement with the pairs of contacts 14. When a turn is made by rotating the shaft 6, the fingers 28 engage the walls of the openings 20 and shift the bars 17 in a corresponding direction, together with the brushes 16. Thus, the contacts 14 on either side are engaged by the brushes 16 for energizing the corresponding lights 3 or 4, together with their respective indicating lights 25. Of course, it is assumed that the hand switch 27 has been previously closed. As the steering shaft 6 continues to rotate the fingers 28 may swing out of engagement with the bars 17, as suggested in dotted lines in Fig. 5 of the drawings. It will thus be seen that the signal lights will remain energized during the entire time that the turn is being negotiated. After the turn has been completed and while the steering apparatus of the vehicle is returning to straight ahead position, the detents 30 again enter the openings 20 and return the elements 17, 16, etc., to the position shown in Fig. 5 of the drawings out of engagement with the contacts 14. In Fig. 7 of the drawings, the reference numeral 33 designates the usual storage battery of the vehicle 2 which supplies current to the signaling system. The end members 22 are provided with openings 34 which accommodate the conductor wires 35 to the binding posts 19 on the brushes 16. It will be observed that the spacing of the members 23 from the side edges of the insulating plate 9 permits the conductor wires 36 to be readily connected to the binding posts 15.

It is believed that the many advantages of an automobile direction signal switch constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. In combination with a motor vehicle steering column comprising a housing having an opening therein and a steering shaft operable in said housing, a direction signal switch including a plate of insulating material mounted on the housing over the opening, said plate having grooves in its opposite faces and further having slots therein connecting the grooves, contacts in the end portions of one of the grooves, a brush slidable in said one groove and engageable selectively with the contacts, a bar slidable in the other groove, a member on said bar operable in the slot and secured to the brush for retaining said brush in said one groove, and means on the steering shaft engageable with the bar for shifting the brush in either direction upon rotation of said shaft in either direction.

2. In combination with a motor vehicle steering column comprising a tubular housing having an opening therein and integral flanges thereon adjacent the opening, and a steering shaft operable in the housing, a direction signal switch including a plate of insulating material secured on the flanges over the opening in the housing, said plate having transversely extending grooves in its opposite faces, said plate further having a transverse slot therein communicating with the grooves, electric contacts mounted in the end portions of one of the grooves, a brush of current conducting material slidable in said one groove and engageable selectively with the contacts, a bar, having an opening therein, slidable in the other groove, a member on said bar operable in the slot and secured to the brush for retaining said brush in said one groove, a tubular casing mounted on the steering shaft, and a spring projected detent slidably mounted in said tubular casing and engaged in the opening in the bar for shifting the brush into engagement with the contacts upon rotation of the steering shaft.

HENRY SLAWATYCKI.